E. L. AIKEN.
ADJUSTABLE STEERING WHEEL.
APPLICATION FILED FEB. 14, 1918.
1,298,151.
Patented Mar. 25, 1919.
2 SHEETS—SHEET 1.
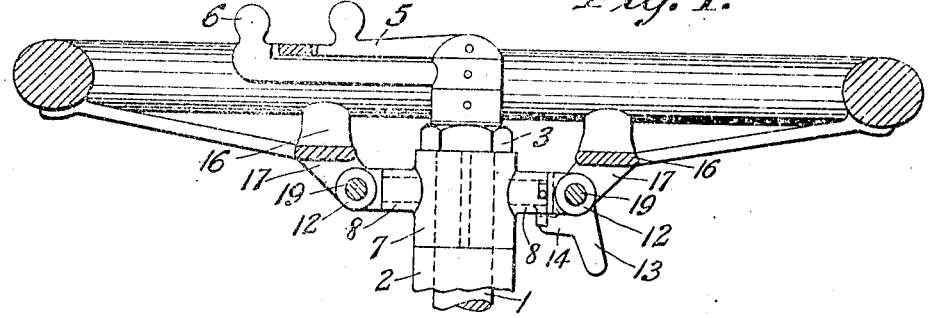
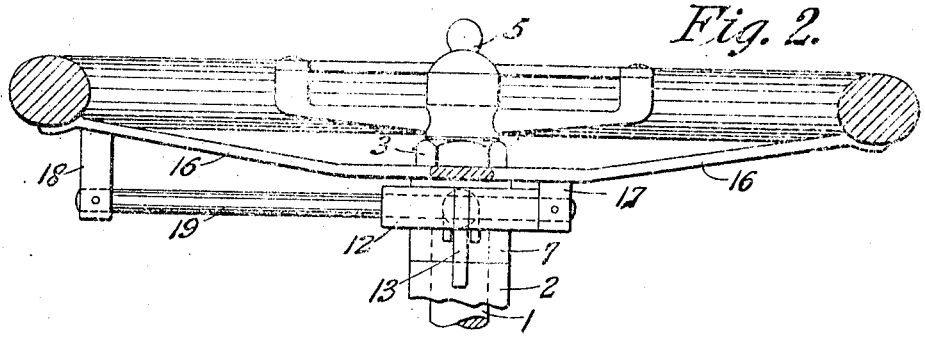
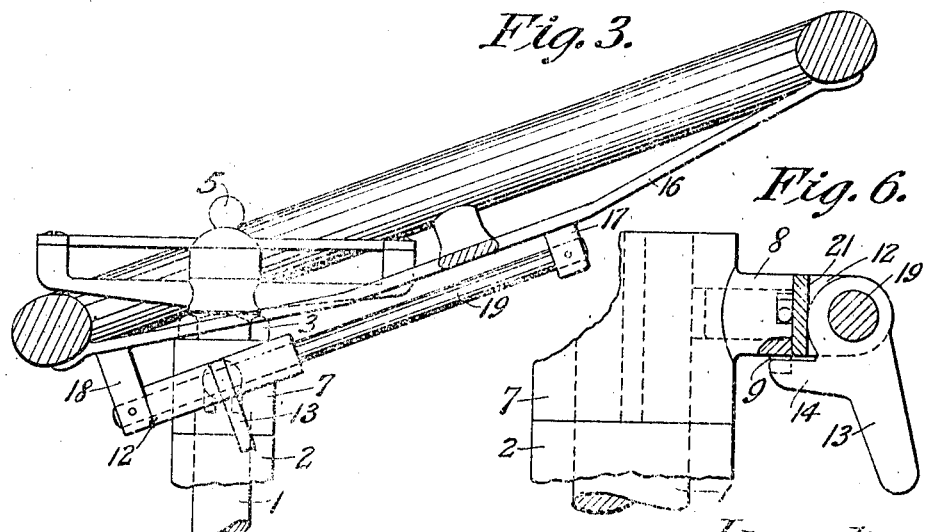
Inventor
Edward L. Aiken

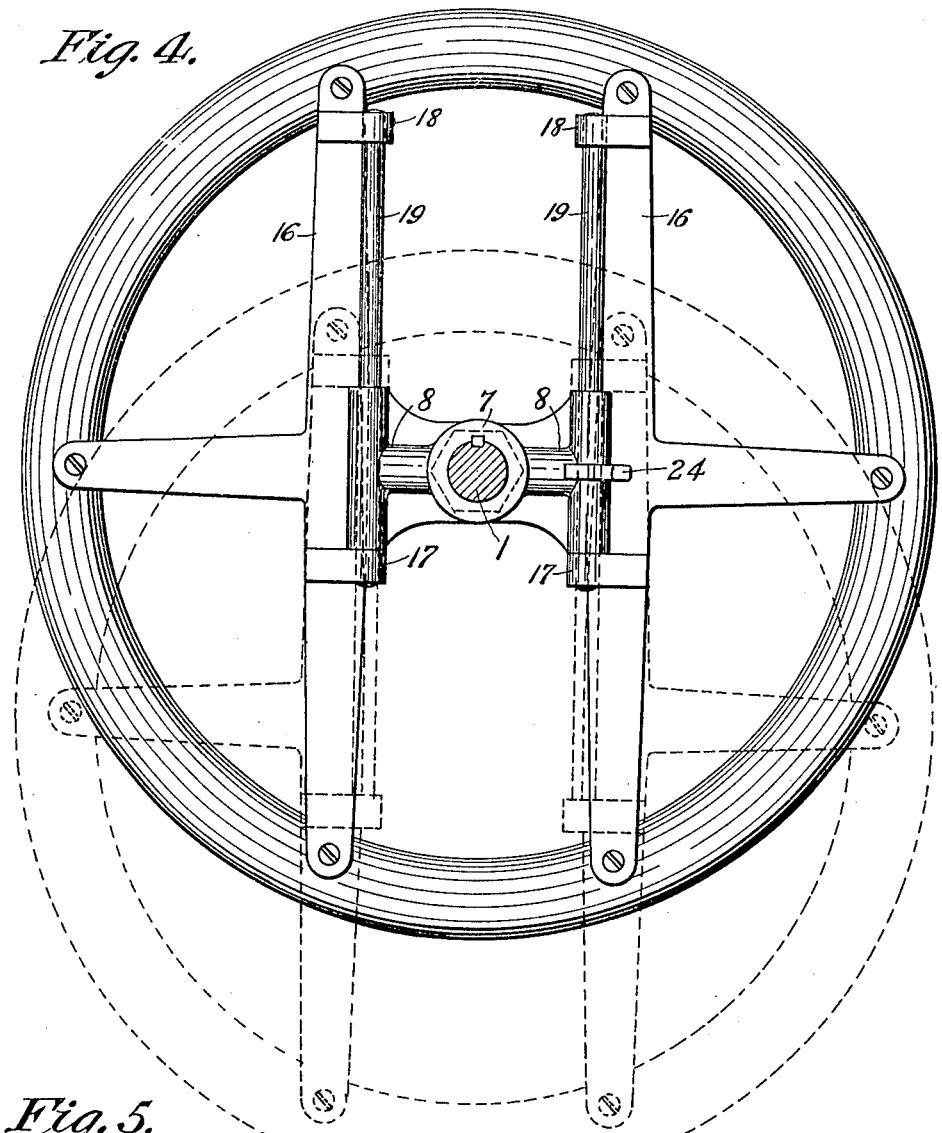
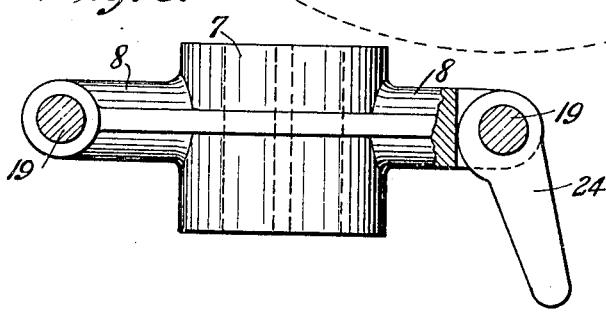

UNITED STATES PATENT OFFICE.

EDWARD L. AIKEN, OF SPRINGFIELD, MASSACHUSETTS.

ADJUSTABLE STEERING-WHEEL.

1,298,151. Specification of Letters Patent. Patented Mar. 25, 1919.

Application filed February 14, 1918. Serial No. 217,227.

*To all whom it may concern:*

Be it known that I, EDWARD L. AIKEN, a citizen of the United States of America, residing in Springfield, in the county of Hampden and State of Massachusetts, have invented new and useful Improvements in Adjustable Steering-Wheels, of which the following is a specification, reference being had to the accompanying drawings, and numerals of reference marked thereon.

While the invention is primarily designed and adapted for automobiles and the embodiment of my invention as herein illustrated relates more particularly to its employment in connection with automobiles it will readily be seen that the invention is adapted to be used in conjunction with flying machines, motor boats and other vehicles adapted to be guided by the employment of a steering wheel.

Heretofore it has been quite common, especially with the cheaper class of automobile, to fix the steering wheel to the steering post or shaft and to hold the same at all times rigidly thereto and concentric therewith.

This is objectionable as the fixed position of the steering wheel does not permit any adjustment and often times greatly impedes the movement of the driver when moving into and out of the seat.

Various mechanisms have been designed to overcome this difficulty. These, however, have been objectionable because of being complicated and because they were not constructed for convenient manipulation; have been lacking in the necessary rigidity required for safety and convenience and because these mechanisms provided for moving the wheel in a curved path rather than in a straight path during the greater portion of its movement away from its concentric relation to the steering post.

The object of my invention is to provide a construction which shall be simple, comparatively inexpensive in cost of construction, easily installed and operated, the operative parts being secured together so as to give the requisite strength and rigidity and to produce a construction wherein the movement of the wheel from its concentric position with the post is in a straight line excepting where necessary to move it for a portion of its traverse in a different line in order to avoid interference with the gas and spark controlling mechanism.

I accomplish the objects of my invention by the construction herein shown.

In the accompanying drawings in which like numerals of reference indicate like parts—

Figure 1 is a side elevation partly in section showing a steering wheel mounted upon its steering post or shaft.

Fig. 2 is a side elevation as seen looking at Fig. 1 from the right.

Fig. 3 is a side elevation showing the wheel moved to its extreme position away from the driver or out of its concentric position with reference to the steering post.

Fig. 4 is a plan view of a wheel and its attached mechanism as seen from its lower face showing in full lines the position of the wheel when concentric with its steering post and showing in dotted lines its position when moved out of such concentric position.

Fig. 5 is a detached view on an enlarged scale of the locking mechanism by means of which the wheel may be locked in place, and Fig. 6 is a like detached view of a modification in the locking mechanism.

The construction and operation of the mechanism will be readily understood on referring to the drawings in connection with the following description.

1 indicates an ordinary steering post, 2 the column in which the post is mounted, 3 a clamping nut mounted on the post 1, 5 and 6 the usual mechanism for controlling the spark and gas, 7 a head keyed to the shaft 1 and rigidly secured thereto, 8 arms projecting from the head 7 and preferably integral therewith and arranged diametrically opposite each other, 19 sliding rods attached to the steering wheel and passing through members 12 mounted on arms 8.

In the construction illustrated in Figs. 1, 2 and 3 the steering wheel spokes do not lie in the same plane as the steering wheel rim, but project from the rim downwardly and toward the center. Lugs 17 and 18 are secured to the spokes 16 preferably by being made integral therewith and rods 19 are secured to these lugs as most clearly shown in Figs. 2 and 3. Members 12 are mounted on the arms 8 and the rods 19 slide in the members 12 so that when not locked in position the steering wheel may be moved from its concentric position as shown in Fig. 2 to its extreme position at one side. If the mechanism is such that the spark and gas control levers and parts are mounted below the steering wheel then the steering wheel may be moved in a direct line, in which event it is unnecessary that the members 12 be pivotally mounted on their supporting arms, but if the spark and gas controlling mechanism is mounted above the spokes of the steering wheel as is quite common and as illustrated in Figs. 2 and 3 then in order to move the wheel to its extreme position away from the driver it becomes necessary that it be tilted so as to permit the rim of the hand wheel to drop below the gas or spark controlling lever as shown in Fig. 3 and to allow for this movement I mount the members 12 pivotally on their supporting arms so that the wheel may be moved in a direct line to a point where the rim of the wheel would come in contact with one of the control levers and then the wheel may be tilted on the trunnion bearings and moved to its extreme position as illustrated in Fig. 3.

It will be readily seen that various means of locking the wheel in either extreme position or at any intermediate points may be employed. I show, however, one simple means of accomplishing this result, the same comprising a lever 13 mounted in the trunnion bearing 12 and adapted to bear with the camming action against the ledge 21 (see Fig. 6) this lever by preference being provided with an offset lug 14 adapted to engage in a slot 9, in the member 8, thus preventing both sliding movement of the rods 19 in the trunnion bearings 12 and also preventing rotation of the trunnion bearings 12 on the supporting member 8.

When the usual controlling mechanism such as the quadrant, spark and gas levers, are so arranged that they do not interfere with the adjustment of the wheel in a straight line or plane, then I prefer that the arms 8 be formed integral with the head 7 and that openings be formed therein to receive the rods 19 and permit them to slide therein. In this event I prefer to employ the locking lever 24 shown in Fig. 5 and to form a slot in the arm in which the camming part of the locking lever 24 may enter and thus effectively lock the supporting rods 19 in position in the supporting bearings 12.

In order to move the steering wheel out of its concentric position with reference to the steering post it simply becomes necessary to move the locking lever in a direction to carry it out of engagement with its locking slot and then to move the wheel to the desired position which in practice will usually consist in the extreme position away from the driver.

When the mechanism is arranged so as to move the wheel to its extreme position away from the driver without its being necessary to turn it from its original plane then it will readily be seen the wheel may be conveniently employed to steer the machine because of the fact that the wheel is at all times occupying a plane at right angles with the axis of the steering post.

It will also be observed that when the wheel is moved out of its normal plane in order to escape interference with the spark and gas controlling mechanism it is moved out of its normal plane but slightly, in which position it is adapted to be used to steer the machine if necessary and is not in either event open to the objection which frequently obtains where the wheel is moved to a position where its plane is more nearly vertical and hence practically inoperative as a controlling means.

Having therefore described my invention what I claim as new and desire to secure by Letters Patent is:—

1. The combination in a steering mechanism having a column, a steering post therein, a steering wheel comprising a suitable rim, spoke-like members attached thereto provided with downwardly projecting lugs, supporting rods secured to said lugs, a bearing for said supporting rods carried by the steering post, and means to lock one of said supporting rods in position in its bearings.

2. The combination in a steering mechanism of a column, a steering post mounted therein, a steering wheel having spoke-like members provided with lugs, supporting rods fixed to said lugs, bearings to support the said rods and permit sliding movement of the same, said bearings being pivotally mounted and carried by the steering post and means to lock the mechanism in position.

3. In a steering mechanism, the combination of a column, a steering post mounted therein, a collar mounted on the post and fixed thereto, arms projecting from said collar, bearings pivotally mounted on said arms, a steering wheel, supporting rods attached thereto and adapted to slide in said bearings and means to lock the mechanism in position.

4. In a steering mechanism the combination of a steering post suitably supported, a wheel provided with supporting rods secured thereto and arranged below and parallel to the plane of the face of the wheel, bearings for said rods carried by the steering post, said rods being adapted to slide in said bearings and means to lock one of said rods in position.

5. The combination in a steering mechanism of a suitable steering post, the same being suitably mounted and in operative connection with the steering mechanism of the vehicle, a suitable steering wheel, pivotal bearings carried by the steering post, supporting rods adapted to slide in said bearings and secured to said wheel, and means to lock one of said rods against sliding movement and to at the same time lock one of said pivotal bearings against rotation.

EDWARD L. AIKEN.

Copies of this patent may be obtained for five cents each, by addressing the "Commissioner of Patents, Washington, D. C."